Patented Apr. 30, 1935

1,999,432

UNITED STATES PATENT OFFICE 1,999,432

PRODUCTION OF AMINOALKYL SULPHONIC ACIDS

Heinrich Ulrich and Paul Koerding, Ludwigshafen-on-the-Rhine, and Ottmar Wahl, Leverkusen, Germany, assignors to I. G. Farbenindustrie Aktiengesellschaft, Frankfort-on-the-Main, Germany No Drawing. Application October 11, 1932, Serial No. 637,282. In Germany October 20, 1931

15 Claims. (Cl. 260—129)

The present invention relates to the production of aminoalkyl sulphonic acids.

We have found that aminoalkyl sulphonic acids, of the basic type of taurine ($H_2N-C_2H_4-SO_3H$), can be obtained in a simple manner by causing mineral acid esters of hydroxyalkylamines, including salts of said esters, to react with neutral alkali, i. e. ammonium, alkali metal or alkaline earth metal, salts of sulphurous acid in the presence of some water. The quantity of water employed may be very small and even traces thereof are apparently sufficient to initiate the reaction. For the sake of easy working the quantity of water employed is, however, generally chosen at least equal to that of the mineral acid ester employed and, preferably, equal to that of both reaction components. It may be also further increased though we prefer such quantities of water from which the reaction product crystallizes so that a subsequent removal of water, for example by distillation, can be avoided in most cases.

For this process the neutral or acid esters or water-soluble salts of the latter, from strong, non-oxidizing mineral acids are preferred, such as those of sulphuric and phosphoric acids and halogen hydracids, whereas those from weak mineral acids, such as boric acid, and from nitric acid are less suitable. The acid sulphuric acid esters of hydroxyalkylamines, which are obtainable for example according to the present inventors' and another's application for U. S. patent No. 534,689 filed May 2, 1931, or salts of said acid esters, are especially suitable; specific examples of such sulphuric esters are those of the ethanol amines, as for example mono-, di- or tri-ethanol amines, N-hydroxyethyl aniline, N-ethyl-N-hydroxy-ethyl aniline, N-hydroxyethyl diphenylamine, N-hydroxy-ethyl-N-benyl amine, N-hydroxyethyl piperidine, N-methyl-N-hydroxy-ethyl-N-oleyl amine, N-hydroxyisopropyl-N-methyl - alpha - naphthylamine, N - beta-hydroxy-n-butyl-N-ethyl aniline

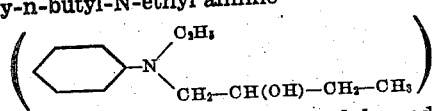

N-beta-hydroxy-n-butyl-N-ethyl-alpha and beta-naphthyl-amines, N-beta-hydroxy-n-butyl-di-phenyl amine, N-gamma-hydroxy-n-butyl-N-n-butyl amine, N - hydroxypropyl - cyclohexyl amine, N-hydroxyethyl-N-benzyl cyclohexyl-amine, N-butyl-N-hydroxy-isopropl aniline and similar N-aryl-N-hydroxyalkyl amines corresponding to the general formula $$R-N-R_2 \atop R_1$$

in which R denotes hydrogen or any alkyl, cycloalkyl, aryl or aralkyl radicle, $R_1$ denotes an aryl or aralkyl radicle, such as phenyl, tolyl, xylyl, naphthyl or benzyl radicles, and $R_2$ denotes a hdroxyalkyl radicle. Corresponding halogen hydracid esters, as for example butyl chlorethylamine, or the corresponding bromides or iodides, and phosphoric esters and water-soluble salts thereof, especially the alkali metal salts, may also be employed. In most cases the reaction proceeds more easily with esters of tertiary amines than with primary and secondary amines. As pointed out above, water-soluble salts of the mineral acid esters may be employed in the place of the acid mineral acid esters. Otherwise, the reaction mixture may be rendered neutral with the aid of alkali as the reaction is preferably carried out in a neutral or slightly alkaline medium.

The reaction with the salts of sulphurous acid is generally carried out in aqueous solution while warming in a closed vessel, generally to from about 120° C. to about 180° C. Temperatures above 160° C. are, however, frequently disadvantageous because decomposition of the initial materials may then take place. If desired water-soluble, neutral and inert organic diluents, such as ethyl alcohol, ethylene glycol, acetone and the like, may be added. The neutral alkali sulphites may be chosen from ammonium, sodium, potassium, lithium, calcium, barium, strontium and magnesium sulphites; the easily water-soluble alkali metal sulphites, as for example sodium and potassium sulphites and ammonium sulphite, are especially suitable for the process. Advantageously the sulphites are employed in slight excess to the quantities theoretically required; the following equation indicates by way of example the course of the reaction:

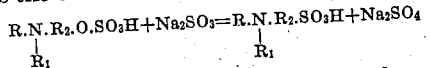

R and $R_1$ being hydrogen or any hydrocarbon radicle, such as alkyl, cycloalkyl, aryl or aralkyl radicles or R and $R_1$ may form a heterocyclic nucleus with the nitrogen atom, while $R_2$ is an alkylene group.

The process according to the present invention offers special advantages in so far as it allows of preparing from readily accessible mineral acid esters of hydroxy-alkylamines the corresponding sulphonic acids free from undesirable by-products and in good yields. In the said manner valuable intermediate products for the preparation of assistants for the textile and related industries, dyestuffs, pharmaceutical preparations and the like may be obtained.

The following examples will further illustrate the nature of this invention but the invention is not restricted to these examples. The parts are by weight.

*Example 1*

A solution of 140 parts of mono-hydroxyethyl amine sulphuric ester in 300 parts of water is heated together with 165 parts of commercial sodium sulphite containing 15 per cent of sodium sulphate in an autoclave at 160° C. After about 6 hours the reaction is completed and the taurine formed may be precipitated with alcohol and purified after cooling the reaction mixture. The reaction proceeds in accordance with the equation:

$$H_2N-CH_2-CH_2-O-SO_3H + Na_2SO_3 = H_2N-CH_2-CH_2-SO_3H + Na_2SO_4.$$

*Example 2*

200 parts of N-n- or iso-butyl-N-hydroxethyl aniline sulphuric ester are dissolved in 500 parts of water and neutralized by means of an aqueous caustic soda solution of 40° Bé. strength. After adding 150 parts of commercial sodium sulphite containing 15 per cent of sodium sulphate, the mixture is heated in an autoclave at 155° C. for about 5 hours. The resulting solution is filtered while hot and then cooled to about 10° C. N-butyl-N-phenyl taurine formed thus crystallizes out in the form of its sodium salt

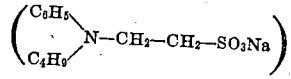

forming white leaflets. It may be recrystallized from a little hot water in which it is readily soluble. The yield is about 90 per cent of the theoretical yield.

*Example 3*

253 parts of the sodium salt of N-methyl-N-hydroxl-ethylaniline sulphuric ester are dissolved in 600 parts of water and heated together with 200 parts of sodium sulphite at 170° C. for four hours in a pressure-tight vessel. After cooling the reaction mass, crude N-methyl-N-phenyl taurine sodium salt

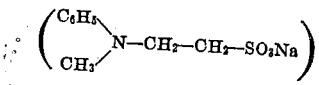

which separates out in the form of leaflets, is filtered off by suction. In this manner a yield of about 80 per cent of the theoretical yield is obtained. For the removal of impurities the crude product is subjected to extraction with ethyl ether and recrystallized from hot water.

*Example 4*

220 parts of the sodium salt of N-hydroxyethyl-N-benzyl-aniline sulphuric ester are dissolved in 400 parts of water and heated together with 150 parts of 85 per cent sodium sulphite to 165° C. for 5 hours in a closed vessel. The resulting reaction mass is filtered while hot after the addition of 200 parts of water. When the filtrate is cooled, the sodium salt of N-benzyl-N-phenyl taurine

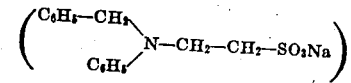

separates out in the form of white leaflets. The product may be purified by recrystallization from hot water, if necessary after an extraction with ethyl ether. The free acid may be obtained from the sodium salt by treatment with dilute aqueous sulphuric acid and salting out with aqueous common salt solution.

*Example 5*

340 parts of the acid sulphuric ester of N-ethyl-N-hydroxyethyl-alpha-naphthylamine are dissolved in 600 parts of water and neutralized by adding 120 parts of an aqueous caustic soda solution of 40° Bé. strength. After adding 200 parts of 85 per cent soduim sulphite the whole is heated in an autoclave for 6 hours to 160° C. After cooling, 300 parts of a 25 per cent aqueous sulphuric acid solution are added, whereby N-ethyl-N-alpha-naphthyl taurine

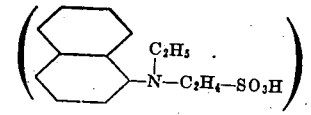

is precipitated in the form of fine leaflets. The product can be purified by recrystallization from hot water.

*Example 6*

200 parts of the sodium salt of the acid sulphuric ester of N-hydroxyethyl di-phenyl amine are heated in an autoclave for 16 hours to 140° C. together with 300 parts of water and 110 parts of sodium sulphite. After cooling, the crystal pulp obtained is freed from liquid by filtration by suction and is washed with ethyl ether. The resulting crude sodium salt of diphenyl taurine $(C_6H_5)_2=N-CH_2-CH_2-SO_3Na)$ can be recrystallized from water in which it is easily soluble, whereas the corresponding free sulphonic acid can be obtained by acidification of an aqueous solution of the salt with the aid of a strong mineral acid.

What we claim is:—

1. The process for the production of aminoalkyl sulphonic acids which comprises reacting a mineral acid ester of an amine containing at least one hydroxyl group attached to a low molecular alkyl radicle, with a neutral alkali metal salt of sulphurous acid in the presence of water.

2. The process for the production of aminoalkyl sulphonic acids which comprises warming a mineral acid ester of an amine containing at least one hydroxyl group attached to a low molecular alkyl radicle, with a neutral alkali metal salt of sulphurous acid in the presence of water.

3. The process for the production of aminoalkyl sulphonic acids which comprises warming an ester of an amine containing at least one hydroxyl group attached to a low molecular alkyl radicle, and a strong, non-oxidizing mineral acid with a neutral alkali metal salt of sulphurous acid in the presence of water.

4. The process for the production of aminoalkyl sulphonic acids which comprises warming an ester of an amine containing at least one hydroxyl group attached to a low molecular alkyl radicle, and a strong, polybasic non-oxidizing mineral acid with a neutral alkali metal salt of sulphurous acid in the presence of water.

5. The process for the production of amino-alkyl sulphonic acids which comprises warming an ester of an amine containing at least one hydroxyl group attached to a low molecular alkyl radicle, and a halogen hydracid with a neutral alkali metal salt of sulphurous acid in the presence of water.

6. The process for the production of amino-alkyl sulphonic acids which comprises heating a mineral acid ester of an amine containing at least one hydroxyl group attached to a low molecular alkyl radicle, with a neutral alkali metal salt of sulphurous acid in the presence of water to a temperature between 100° C. and the decomposition temperature of the said initial materials.

7. The process for the production of amino-alkyl sulphonic acids which comprises heating a sulphuric ester of an amine containing at least on hydroxyl group attached to a low molecular alkyl radicle, with a neutral alkali metal salt of sulphurous acid in the presence of water to a temperature between 100° C. and the decomposition temperature of the said initial materials.

8. The process for the production of amino-alkyl sulphonic acids which comprises heating a sulphuric ester of an amine containing at least one hydroxyl group attached to a low molecular alkyl radicle, with a neutral alkali metal sulphite in the presence of water to a temperature between 100° C. and the decomposition temperature of the said initial materials.

9. The process for the production of amino-alkyl sulphonic acids which comprises heating a sulphuric ester of an amine containing at least one hydroxyl group attached to a low alkyl radicle, with sodium sulphite in the presence of water in a closed vessel to from about 120° to about 180° C.

10. The process for the production of amino-alkyl sulphonic acids which comprises heating a sulphuric ester of a hydroxyethyl amine with sodium sulphite in the presence of water in a closed vessel to from about 120° to about 160° C.

11. The process for the production of amino-alkyl sulphonic acids which comprises heating a sulphuric ester of a tertiary hydroxyalkyl amine corresponding to the general formula

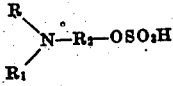

in which R and R₁ are hydrocarbon radicles and R₂ is an alkylene group, with sodium sulphite in the presence of water in a closed vessel to from about 120° to about 180° C.

12. The process for the production of amino-alkyl sulphonic acids which comprises heating a sulphuric ester of a tertiary hydroxyalkyl amine corresponding to the general formula

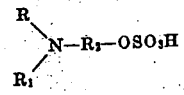

in which R and R₁ are hydrocarbon radicles and R₂ is an ethylene group, with sodium sulphite in the presence of water in a closed vessel to from about 120° to about 160° C.

13. The process for the production of amino-alkyl sulphonic acids which comprises heating a sulphuric ester of a tertiary N-hydroxyethyl-N-arylamine corresponding to the general formula

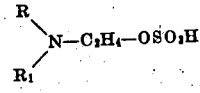

in which R is a hydrocarbon radicle and R₁ is an aryl radicle, with sodium sulphite in the presence of water in a closed vessel to from about 120° to about 160° C.

14. Amino-alkyl sulphonic acids corresponding to the general formula

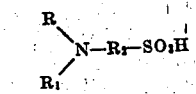

in which R denotes hydrogen, an alkyl, cycloalkyl, aryl or aralkyl radicle; R₁ denotes an aryl or aralkyl radicle, the sum of the carbon atoms contained in R and R₁ being at least 7 and in which R₂ denotes an alkylene radicle containing at least 2 carbon atoms.

15. Amino-alkyl sulphonic acids corresponding to the general formula

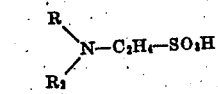

in which R denotes hydrogen, an alkyl, cycloalkyl, aryl or aralkyl radicle and R₁ denotes an aryl or aralkyl radicle, the sum of the carbon atoms contained in R and R₁ being at least 7.

HEINRICH ULRICH.
PAUL KOERDING.
OTTMAR WAHL.